United States Patent
Weber et al.

(10) Patent No.: US 8,079,252 B2
(45) Date of Patent: Dec. 20, 2011

(54) ADAPTER FOR PRESSURE SENSORS FOR CARRYING OUT LONG-TERM CYLINDER PRESSURE MONITORING ON INTERNAL COMBUSTION ENGINES

(75) Inventors: Alex Weber, Winterthur (CH); Ulrich Staiger, Stein Am Rhein (CH); Paul Engeler, Frauenfeld (CH)

(73) Assignee: Kistler Holding, AG, Winterthur (CH)

( * ) Notice: Subject to any disclaimer, the term of this patent is extended or adjusted under 35 U.S.C. 154(b) by 317 days.

(21) Appl. No.: 12/516,688

(22) PCT Filed: Dec. 5, 2007

(86) PCT No.: PCT/CH2007/000611
§ 371 (c)(1),
(2), (4) Date: May 28, 2009

(87) PCT Pub. No.: WO2008/071022
PCT Pub. Date: Jun. 19, 2008

(65) Prior Publication Data
US 2010/0065013 A1      Mar. 18, 2010

(30) Foreign Application Priority Data
Dec. 11, 2006   (CH) ........................................ 2011/06

(51) Int. Cl.
*G01M 15/08*       (2006.01)
(52) U.S. Cl. .................................................... 73/114.18
(58) Field of Classification Search ............... 73/114.16, 73/114.18, 114.19, 114.21
See application file for complete search history.

(56) References Cited

U.S. PATENT DOCUMENTS

| 4,218,926 | A | 8/1980 | DeVisser |
| 4,425,800 | A | 1/1984 | Claassen et al. |
| 5,708,210 | A | 1/1998 | Gardellin |
| 5,756,900 | A | 5/1998 | Arie et al. |
| 2005/0160828 | A1 | 7/2005 | Hasunuma |

FOREIGN PATENT DOCUMENTS

| DE | 2649358 | 11/1977 |
| DE | 19813756 | 10/1999 |
| EP | 0715159 | 6/1996 |
| GB | 2019007 | 10/1979 |
| WO | WO 00/65984 | 11/2000 |

OTHER PUBLICATIONS

English translation of International Preliminary Examination Report on Patentability, issued Jul. 7, 2009.

*Primary Examiner* — Eric S McCall
(74) *Attorney, Agent, or Firm* — Dority & Manning, P.A.

(57) ABSTRACT

An adapter for pressure sensors for monitoring long-term cylinder pressures in internal combustion engines comprises a housing with a gas duct, a connection to a cylinder cover of an internal combustion engine, a rear opening of the gas duct from the housing with an apparatus for closing this rear opening in a gastight manner, and a connection for inserting a pressure sensor with a sensor membrane. The transition line of the opening in the gas duct, which is reached by the sensor membrane in the inserted state in order to be exposed to the gas pressure in the gas duct, is on a plane. The transition line forms the transition from the contour of the gas duct to the connection to the sensor. There is a continuous transition from the sensor membrane to the contour of the gas duct.

20 Claims, 2 Drawing Sheets

US 8,079,252 B2

ADAPTER FOR PRESSURE SENSORS FOR CARRYING OUT LONG-TERM CYLINDER PRESSURE MONITORING ON INTERNAL COMBUSTION ENGINES

CROSS-REFERENCE TO RELATED APPLICATIONS

This application claims priority to International Application Serial No. PCT/CH2007/000611 filed Dec. 5, 2007, which claims priority to Swiss Application No. CH 2011/06 filed Dec. 11, 2006.

TECHNICAL FIELD

The invention relates to an adapter for pressure sensors for monitoring long-term cylinder pressures in internal combustion engines, said adapter comprising a housing with a gas duct, a connection to a cylinder cover of an internal combustion engine, a rear opening of the gas duct from the housing having an apparatus for closing this rear opening in a gastight manner as well as a connection for inserting a pressure sensor with a sensor membrane.

BACKGROUND

Adapters for mounting pressure sensors at internal combustion engines are for example used on large diesel engines, such as marine vessel diesel engines, for carrying out long-term pressure monitoring. Such adapters are attached on cylinder covers with a connection provided for this purpose, said adapters themselves having an opening towards the cylinder. The adapters comprise a housing as well as a gas duct which in the mounted state can exchange gas with the gas in the cylinder and, thus, is in particular exposed to the gas pressure within the cylinder.

Furthermore, such adapters have a connection for inserting a pressure sensor with a sensor membrane wherein the sensor membrane in the inserted state reaches the gas duct and is exposed to the gas pressure within the gas duct.

Conventional adapters have recesses, necks and/or pockets at sites close to the sensor at which deposits accumulate after extended operation periods that affect the measurement results. In the lubricating oil operation of marine vessel diesel engines these deposits comprise for example lubricating oil residues as well as scale and soot.

To ensure good measurement results it is necessary to dismount the sensor and to clean the adapter nearly every other day. This means an enormous maintenance effort because for this purpose the operation of the engine, for example the marine vessel diesel engine, must be shut off during the cleaning operation.

OBJECTS AND SUMMARY OF THE INVENTION

It is an object of the present invention to describe an adapter for attaching a pressure sensor having a sensor membrane at an internal combustion engine wherein said adapter offers a low-maintenance operation.

This object has been achieved as described below.

The idea underlying the invention is that the transition line of the opening in the gas duct which is reached by the sensor membrane in the inserted state to be exposed to the gas pressure in the gas duct lies on a plane. The transition line forms the transition between the contour of the gas duct and the connection to the sensor.

The planar form of the transition line of the opening ensures that the sensor membrane which is usually embodied with a planar edge itself and, in the inserted state, forms a portion of the contour of the gas duct forms as continuous a transition as possible into the direct circumference of the gas duct. This prevents the formation of pockets due to edges and recesses at which contaminations preferentially form deposits and affect the pressure measurements in an adverse manner.

BRIEF DESCRIPTION OF THE DRAWINGS

In the following the invention will be explained in more detail with respect of the drawings which show FIG. 1 a perspective representation in cross-section of an adapter according to the invention with sensor.

DETAILED DESCRIPTION OF EXEMPLARY EMBODIMENTS

Figure 1:
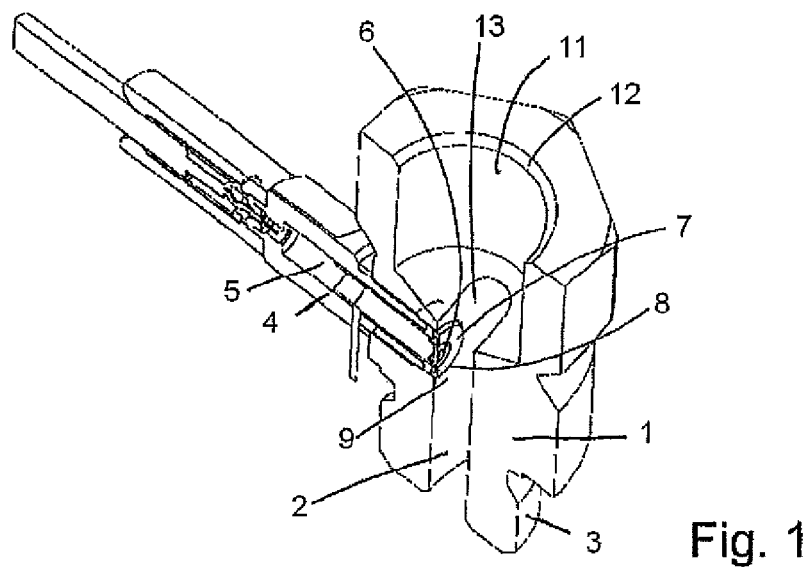

The reference numerals have been kept the same in both drawings.

Figure 2:
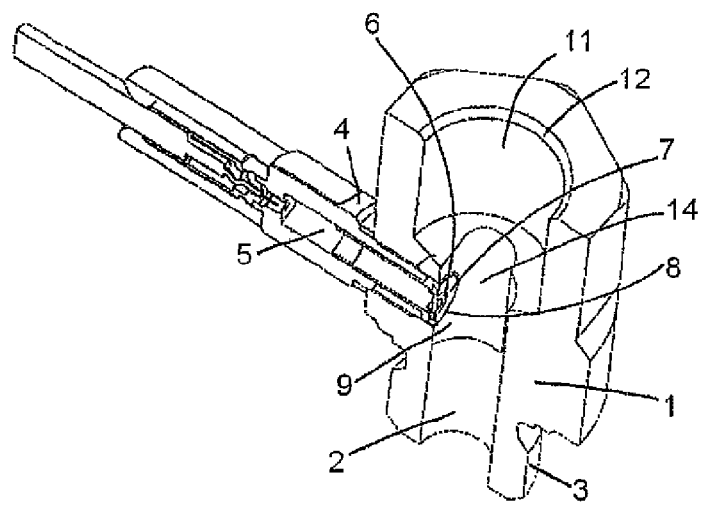
FIG. 2 a perspective representation in cross-section of an adapter according to the invention with sensor in an alternative embodiment.

FIGS. 1 and 2 each show a perspective representation in cross-section of an adapter according to the invention into which a pressure sensor 5 has been inserted. An adapter of this type is particularly suitable for carrying out long-term cylinder pressure measurements and monitoring at internal combustion engines, in particular at large diesel engines, such as marine vessel engines. The adapter comprises a housing 1 defining the contour of a gas duct 2 by its inner walls.

The housing 1 further has a connection 3 to a cylinder cover of an internal combustion engine. In the mounted state, a gas connection from the cylinder to the gas duct 2 is ensured by this connection 3.

At the other end of the housing 1 opposite to the connection 3 to a cylinder cover there is provided a rear opening 11 of the gas duct 2 having an apparatus 12 for gastight sealing of this rear opening 11. This apparatus 12 can for example be an internal thread within this opening into which an indicator valve can be inserted. Thus, the adapter can be inserted in the cylinder cover at the site that is provided for the attachment of an indicator valve. The indicator valve is then attached at the adapter at the apparatus 12 provided therefore. All connections to the adapter must ensure gastight connections to cause no pressure loss at the cylinder.

Furthermore, the adapter comprises a connection 4 for inserting a pressure sensor 5 with a sensor membrane 6. In the inserted state the sensor membrane 6 reaches until the gas duct 2 whereby the sensor membrane 6 is exposed to the pressure within the gas duct 2 and the pressure within the cylinder for carrying out pressure measurements. For this purpose an opening 7 is provided in the gas duct 2 for the advancing of the membrane with a transition line 8 that forms the transition from the contour of the gas duct 2 to the connection 4 of the pressure sensor 5. According to the invention, the transition line 8 of the opening 7 is on a plane. Thus, the sensor membrane 6 usually being provided with a planar edge itself can be fitted flush to the transition line 8 of the opening 7 without forming pockets in which contaminations such as soot can accumulate. In this way, the surface of the sensor membrane 6 remains clean so that the measurements performed with the pressure sensor 5 can provide reliable values.

In first Examples represented in FIGS. 1 and 2 the contour of the gas duct 2 forms a planar surface in the circumference 9 of the transition line 8 of the opening 7.

This planar surface in the circumference 9 of the sensor membrane 6 can be formed by an elongated through hole 13 as represented in FIG. 1 extending until the connection 3 to the cylinder cover. Alternatively, as represented in FIG. 2, this planar surface can also be achieved by a local elongated hole 14. This is for example achieved by local cutting at this position.

To remove contaminations which nevertheless form at the different sites within the adapter the indicator valve can be opened briefly from time to time during engine operation so that contaminations at the adapter are blown away by the pressure generated. Arrows in the Figures represent the flow that is generated when the indicator valve is opened. If there is no indicator valve present also the rear opening 11 can be opened for a short time by opening the apparatus 12 for gastight sealing. It has been found that this cleaning is sufficient as long as the dirt cannot adhere too firmly to the edges. In arrangements according to the prior art a cleaning of this type would not be sufficient to clean the sensor membrane 6.

In particular, one embodiment of the present invention is formed by the adapter described herein with a pressure sensor 5 inserted therein that has a sensor membrane 6 which reaches until the gas duct 2 together with which it forms a common planar surface.

By the devices described herein long-term cylinder pressure measurements and monitoring can be performed on internal combustion engines without much maintenance effort.

Figure 3:
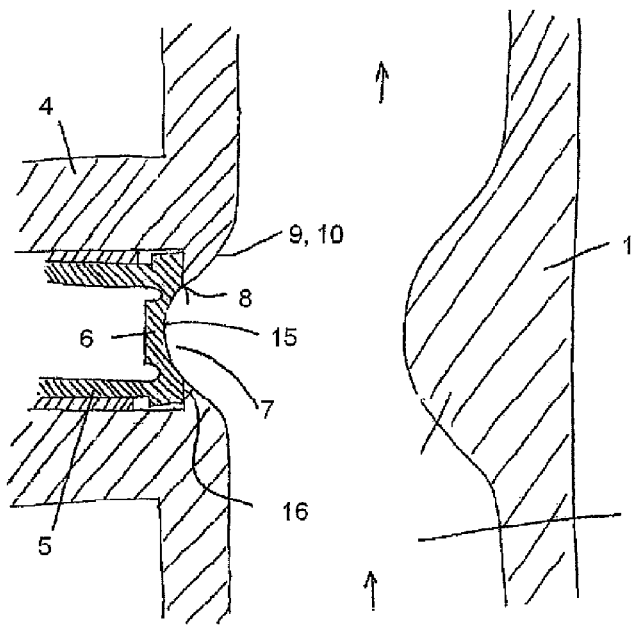
FIG. 3 a representation in cross-section of an adapter according to the invention with sensor in an alternative embodiment.
Figure 4:
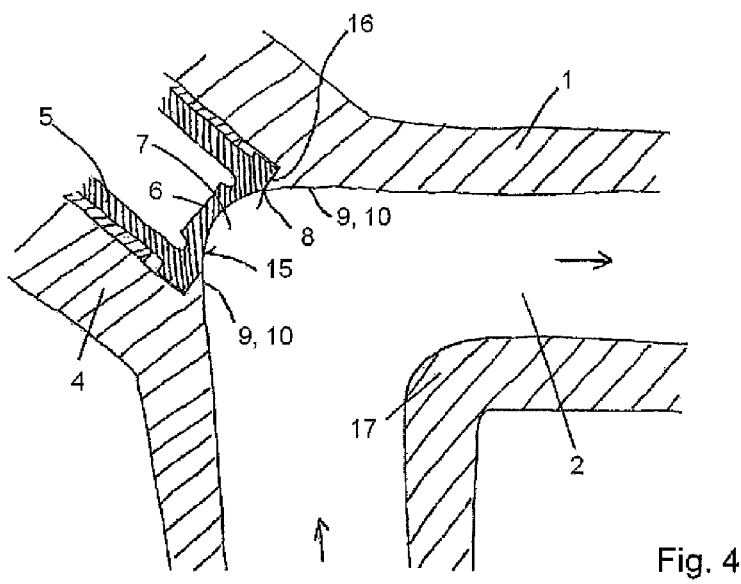
FIG. 4 a representation in cross-section of an adapter according to the invention with sensor in an embodiment with a bend.

Further Examples are shown in FIGS. 3 and 4. These embodiments are particularly suitable for front sealing pressure sensors 5. In this application, front sealing pressure sensors 5 have the advantage compared to pressure sensors 5 with a seal at the rear end that there is no gap between the sensor membrane 6 and the adapter at the transition line 8 of the opening 7. Soot may accumulate in this gap and block the sensor membrane 6 impeding its free oscillation. Front sealing pressure sensors 5 have no gap since they can be pressed at a frontal zone directly on a pressing surface 16 to the housing 1 of the adapter. The pressing surface 16 surrounds the opening 7 on the side of the housing and is defined by the transition line 8. Also in this Example, the transition line 8 of the opening 7 lies on a plane.

In this Example, the circumference 9 of the transition line 8 on the side of the gas duct 2 forms a funnel shaped surface 10. Thus, the housing 1 forms an acute angle around the transition line 8. Particularly, the slopes of the funnel can be straight or curved. It is important that the transition from the contour of the gas duct 2 to the sensor membrane 6 which in the inserted state forms part of this contour forms a continuous transition in the region of the transition line 8 so that no pockets are formed in which contaminations such as soot can accumulate.

To optimize the flow characteristics in the region of the sensor membrane 6 the gas duct 2 can have a bulge 17 opposite of the funnel shaped surface 10. This ensures that during rinsing of the adapter, as described for the Examples in FIGS. 1 and 2, a flow is generated in the circumference 9 of the sensor membrane 6 that results in thorough cleaning.

Constructive advantages in the fabrication of such an adapter according to the invention are achieved if the connection 4 for the pressure sensor is arranged in a bend of the gas duct 2 as represented in FIG. 4. In a bend the funnel shaped surface 10 as well as the bulge 17 are innately present. In this case, the connection 4 for the pressure sensor 5 is mounted on the outer surface of said bend.

Preferably, for these assemblies shown in FIGS. 3 and 4 front sealing pressure sensors are mounted. Such pressure sensors 5 preferably have a sensor membrane 6 with a concave surface 15 so that a continuous transition from the contour of the gas duct 2 to the surface of the sensor membrane is ensured without the formation of pockets. This continuous transition can be seen from FIGS. 3 and 4.

Both Examples of the adapters described herein have advantages. The first ones represented in FIGS. 1 and 2 are easier to fabricate, the others represented in FIGS. 3 and 4 ensure better functionality due to the front seal of the pressure sensor 5 because the membrane circumference that lacks a gap can be kept cleaner.

LIST OF REFERENCE NUMERALS 1 housing
2 gas duct, contour of gas duct
3 connection to a cylinder cover
4 connection for inserting a pressure sensor
5 pressure sensor
6 sensor membrane
7 opening for sensor membrane
8 transition line
9 circumference of the transition line
10 funnel shaped surface
11 rear opening
12 apparatus for gas-tight sealing
13 elongated hole, cut through
14 elongated hole, local
15 concave surface
16 pressing surface
17 bulge

The invention claimed is:

1. An adapter for pressure sensors for carrying out long-term cylinder pressure monitoring on internal combustion engines, the adapter comprising:
    a housing that defines the contour of a gas duct by its inner walls, the gas duct defining a first opening,
    a first connection to a cylinder cover of an internal combustion engine to generate a gas connection between the interior of a cylinder and the gas duct,
    a rear opening of the gas duct out of the housing having an apparatus for gastight sealing of said rear opening,
    a sensor connection for inserting a pressure sensor with a sensor membrane at the first opening wherein said sensor membrane in the inserted state would close the first opening in the gas duct and would be exposed to the gas within the gas duct and wherein said first opening has a transition line that forms the transition from the contour of the gas duct to the first opening wherein the transition line of the first opening is on a plane.

2. An adapter according to claim 1 wherein said apparatus is configured for attachment of an indicator valve.

3. An adapter according to claim 1, further comprising a pressure sensor with a sensor membrane, said pressure sensor being inserted into said sensor connection with said sensor membrane reaching said first opening in said gas duct.

4. An adapter according to claim 1, wherein the contour of the gas duct forms a planar surface in the circumference of the transition line of the opening.

5. An adapter according to claim 4 wherein the planar surface is part of an elongated through hole.

6. An adapter according to claim 4 wherein the planar surface is part of a local elongated hole.

7. An adapter according to claim 1, wherein the contour of the gas duct in the circumference of the transition line of the opening forms a funnel shaped surface with straight slopes.

8. An adapter according to claim 7 wherein the connection is for a front sealing pressure sensor.

9. An adapter according to claim 7 wherein the gas duct has a bulge in the circumference opposite of the funnel shaped surface.

10. An adapter according to claim 7, wherein the course of the gas duct in the region of the connection for the pressure sensor has a bend wherein said connection is arranged on the outside of the bend.

11. An adapter according to claim 7, comprising a pressure sensor with a sensor membrane, said pressure sensor being inserted into said connection with said sensor membrane reaching until said opening in said gas duct, wherein the sensor membrane has a concave surface.

12. An adapter according to claim 11 wherein the concave surface forms a continuous transition to the funnel shaped surface.

13. An adapter according to claim 1, wherein the contour of the gas duct in the circumference of the transition line of the opening forms a funnel shaped surface with curved slopes.

14. An adapter according to claim 8 wherein the gas duct has a bulge in the circumference opposite of the funnel shaped surface.

15. An adapter according to claim 8, wherein the course of the gas duct in the region of the connection for the pressure sensor has a bend wherein said connection is arranged on the outside of the bend.

16. An adapter according to claim 9, wherein the course of the gas duct in the region of the connection for the pressure sensor has a bend wherein said connection is arranged on the outside of the bend.

17. An adapter according to claim 3, wherein the contour of the gas duct in the circumference of the transition line of the opening forms a funnel shaped surface with straight slopes.

18. An adapter according to claim 3, wherein the contour of the gas duct in the circumference of the transition line of the opening forms a funnel shaped surface with curved slopes.

19. An adapter according to claim 18, wherein the sensor membrane has a concave surface.

20. An adapter according to claim 19, wherein the concave surface forms a continuous transition to the funnel shaped surface.

* * * * *